(No Model.)
S. CHASE.
REPAIR CLAMP FOR SPECTACLES.
No. 555,496. Patented Mar. 3, 1896.
Fig. 1
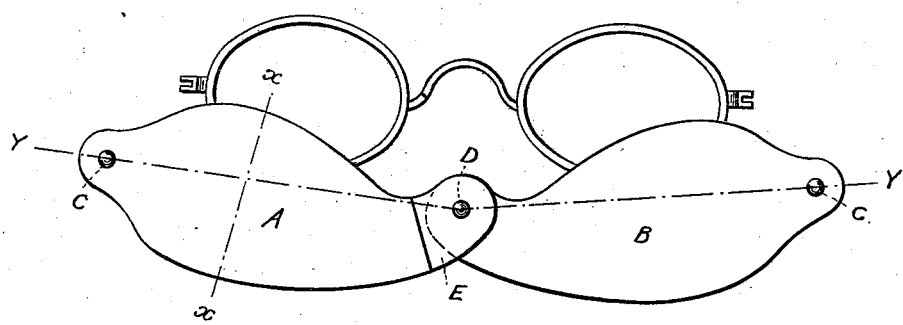
Fig. 2.
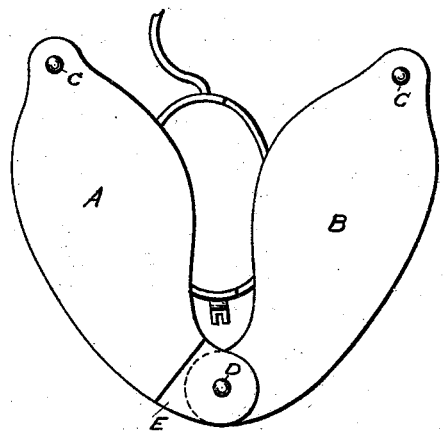
Fig. 3.
Fig. 4
Witnesses
O. E. Little
A. J. Jarvis
Inventor
S. M. Chase
By Attorney
Henry W. Jarvis

UNITED STATES PATENT OFFICE.

SOLON CHASE, OF DENVER, COLORADO.

REPAIR-CLAMP FOR SPECTACLES.

SPECIFICATION forming part of Letters Patent No. 555,496, dated March 3, 1896.

Application filed May 1, 1895. Serial No. 547,783. (No model.)

*To all whom it may concern:*

Be it known that I, SOLON CHASE, a citizen of the United States, residing at Denver, in the county of Arapahoe, State of Colorado, have invented a new and useful Repair-Clamp for Spectacles and other Small Objects; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to clamps for holding broken spectacle or eyeglass frames or other small objects while they are being repaired; and it consists of the improved construction and combination or arrangement of parts which will be hereinafter fully disclosed in the description, drawings and claim.

The objects of my invention are to provide a simple and efficient device for bringing together and holding together the ends of any broken part of a spectacle or eyeglass frame or other small article while being soldered, and also to obviate the necessity of the use of complicated mechanism requiring slots, clamping-blocks, and set-screws to hold the broken ends firmly in place as in all devices and methods hitherto employed in repairing spectacle or eyeglass frames.

By my device the broken parts are brought together and firmly held in place by placing the broken parts in the opposite sides of the clamp and simply closing the clamp until the broken points meet, thus, as will readily be seen from the following description and accompanying drawings, effecting a very considerable saving of time.

Figure 1 is a side view of the clamp with a spectacle-frame in place ready for repair. A and B are two pairs of metal plates riveted at their outer ends. C C are rivets holding together the outer ends of each pair of plates. D is a center rivet common to and binding together the inner ends of both pairs of plates on which rivet the plates turn.

Fig. 2 is an edge view of the clamp, showing vacant space between $A'$ and $A^2$ and also between $B'$ and $B^2$ into which the spectacle-frame or other small object requiring repair is pressed and firmly held in place during repair.

Fig. 3 is a side view of the clamp, partially closed, holding part of a spectacle-frame. Fig. 4 is a sectional view of one pair of plates with a small object between them.

My device consists of a clamp formed by riveting together four thin sheet-metal plates, as shown in Fig. 2. The size and shape are not material and are no part of the invention. The elasticity of each pair of plates permits the object for repair to be pressed between them, as shown in Fig. 4, the pressure of the sides of each pair of plates being sufficient to hold the object steady and in place for repair. When the two parts of the object requiring repair have been placed between the two pairs of plates they are brought together by turning the pairs of plates on rivet B, as shown in Figs. 1 and 3. As will readily be seen, the clamp may be adjusted to any possible break in a spectacle-frame or other small object.

Having thus described my invention, what I claim, and desire to secure by Letters Patent, is—

A repair-clamp for spectacle-frames and other small objects consisting of four thin sheet-metal plates riveted together at one end by a single rivet common to all four plates the two pairs of plates thus formed making the arms of the clamp, each pair being firmly riveted together at its outer ends substantially as described.

SOLON CHASE.

Witnesses:
A. H. SANFORD,
M. V. JOHNSON.